US011828861B1

(12) United States Patent
Lattin

(10) Patent No.: US 11,828,861 B1
(45) Date of Patent: Nov. 28, 2023

(54) SYSTEMS AND METHODS FOR ESTABLISHING A CONFIDENCE LEVEL FOR DEVICE OPERATIONAL DATA

(71) Applicant: INTEGRITY Security Services LLC, Santa Barbara, CA (US)

(72) Inventor: William L Lattin, Los Altos, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 18/050,146

(22) Filed: Oct. 27, 2022

(51) Int. Cl.
*G01S 19/40* (2010.01)
(52) U.S. Cl.
CPC .................................... *G01S 19/40* (2013.01)
(58) Field of Classification Search
CPC ......................................................... G01S 19/40
USPC .................................................... 342/357.23
See application file for complete search history.

(56) References Cited

U.S. PATENT DOCUMENTS

| 2022/0317312 A1* | 10/2022 | Sharma | ................... G01S 19/48 |
| 2022/0350030 A1* | 11/2022 | Shuman | ................ G01S 19/215 |
| 2022/0353688 A1* | 11/2022 | Shuman | .............. H04W 12/122 |

\* cited by examiner

*Primary Examiner* — Harry K Liu
(74) *Attorney, Agent, or Firm* — MH2 TECHNOLOGY LAW GROUP, LLP

(57) ABSTRACT

Systems, methods, and devices for establishing a confidence level for local operational data for a device within a technological ecosystem, such as the V2X ecosystem. The systems, methods, and devices may perform operations that include: obtaining local operational data for the device; obtaining messages from multiple external devices participating in the ecosystem, wherein each of the messages includes external operational data for the transmitting external device; determining, based on the local operational data and the external operational data from the messages, a confidence level for the local operational data; and executing a remedial action when the confidence level falls below a threshold for the confidence level. The systems and devices may include a local data source that stores the local operational data and a communication interface.

30 Claims, 7 Drawing Sheets

SYSTEMS AND METHODS FOR ESTABLISHING A CONFIDENCE LEVEL FOR DEVICE OPERATIONAL DATA

FIELD OF THE INVENTION

This invention relates to systems, devices, and methods for establishing a confidence level for operational data received by and maintained within a device. More particularly, the invention relates to systems, methods and techniques for ensuring that time and geolocation-specific data used by various computerized devices of an ecosystem remains uncompromised, e.g., by third-party malefactors.

BACKGROUND

As computers have become ever more miniaturized and commoditized, manufacturers are producing more and more varied devices that include one or more embedded computers or processors. The computer in a computerized device can control the device's operation; collect, store, and share data; communicate with other computers and other computerized devices; and update its own software, among other things.

The Internet of Things (IoT) is a network or ecosystem of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" needs to be uniquely identifiable through its embedded computing system, and be able to inter-operate within the existing Internet infrastructure or by using other communications media.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, roadside units, and the like) contain at least one, and often many, embedded processors or embedded computer systems, and are computer-controlled in at least some aspects.

These computer-controlled elements of the transportation network or transportation ecosystem typically communicate with each other, passing various types of information back and forth. For instance, a roadside unit (RSU) is a computerized device located on the roadside that communicates with passing vehicles and other RSUs. An RSU may be fixed at one location, (e.g., in a box embedded beside a highway) or it may be a mobile, portable device that is carried and deployed as needed by a roadwork crew, emergency worker, or the like. The various computer-controlled elements of the transportation network may react, respond, change their operation, or otherwise depend upon the information received/sent from/to other vehicles in Vehicle-to-Vehicle (V2V; also known as Car-to-Car (C2C)) communications and/or from/to infrastructure elements, (such as RSUs) in Vehicle-to-Infrastructure (V2I; also known as Car-to-Infrastructure (C2I)) communications for safe, correct, efficient, and reliable operation. In general, the passing of information from a vehicle to any entity that may affect the vehicle (e.g., other vehicles (V2V) and infrastructure elements (V2I)), and vice versa, is referred to as Vehicle-to-everything (V2X) or Car-to-everything (C2X). Some primary goals of V2X are road safety, traffic efficiency, and energy savings. Some messages that are exchanged in such an environment may be basic safety messages (BSM), cooperative awareness messages (CAM), and decentralized environmental notification messages (DENM).

The computers in computerized devices operate according to their software and/or firmware and data. In order to ensure safe and proper operation, the computerized devices must be properly initialized and updated (e.g., provisioned) with, and must maintain, the proper digital assets, e.g., software, firmware, executable instructions, digital certificates (e.g., public key certificates), cryptographic keys, time data, location/position data, and the like (hereinafter collectively referred to as "digital assets" or "software") as intended by the manufacturer or V2X system operator, so that the IoT consists only of devices that are executing authorized, known-to-be-good software and data.

The digital assets provided to a computerized device are typically time dependent in that they may, for example, become available and expire at a particular date and time. Further, the digital assets may be location specific, for example based on regulations in certain jurisdictions. Moreover, where time and location are mission critical (e.g., autonomous vehicles, robotic home patrol, etc.) having confidence in a time and geographic location used by a computerized device is important.

SUMMARY

The present inventor has realized that certain problems arise when state of the art systems are relied upon for setting operational data, such as the internal time and/or location of a computerized device, and that under some circumstances, confidence in the device's internally determined time and location cannot be established and maintained. For example, when unauthorized and/or malicious persons or organizations (e.g., hackers) spoof a global navigation satellite system (GNSS) signal and send the spoofed signal to a computerized device with erroneous operational information (e.g., erroneous time and/or location information, among others), the unauthorized party may "fool" the computerized device, resulting in unreliable communications and/or actions being performed by the computerized device.

As another example, problems may also arise in the functioning of computerized devices that are designed to operate under geographic restrictions, such as RSUs in the V2X infrastructure, as they will not function properly if the geolocation and/or time and/or other operational data are incorrect. For example, specific digital assets provided to an RSU may not be appropriate and/or up-to-date if a communicated geographical location differs from an actual geographical operating location of that RSU and/or if the date and time in the RSU are not correct.

Accordingly, the inventor has determined it is desirable to provide improved systems, methods and techniques for establishing a confidence level for the operational data for a computerized device so that remedial action may be taken when appropriate.

Described herein are systems, methods (e.g., computer-implemented methods), computer readable media, and devices for establishing a confidence level for local operational data of a device within an ecosystem. In some embodiments, the system or device may include a local data source configured to maintain local operational data for the device, a communication interface, and a processor that is operably connected to the communication interface and the local data source. In various embodiments, the systems, methods, media, and devices may perform processes, functions, and/or operations that include: obtaining, (e.g., from the local data source), local operational data for the device; obtaining, (e.g., using the communication interface), a plurality of messages from a plurality of external devices participating in the ecosystem, wherein each of the plurality of messages comprises external operational data corresponding to a respective external device; determining, (e.g., using the processor and based on the local operational data and the external operational data from the plurality of messages), a confidence level for the local operational data; and executing a remedial action when or if the confidence level falls below a threshold for the confidence level.

In various embodiments, the operations may further include updating the local operational data based on information received via the communication interface from a publicly available service. In some such embodiments, the updating may be performed at a predetermined interval. Also in some such embodiments, the information may be unencrypted and received from the publicly available service. Also in some such embodiments, the publicly available service may be the global navigational satellite system (GNSS).

In various embodiments, each message among the plurality of messages may be digitally signed.

In various embodiments, the local operational data may be or include local time data, the external operational data may include external time data, and the operations may further comprise: generating an updated local time by updating the local time data to correspond to time information received from a publicly available service; comparing the external time data from each message of the plurality of messages to the updated local time data to determine a time deviation between the updated local time data and the external time data from each message; and in response to determining that the time deviation for a message exceeds a tolerance value, incrementing a deviation counter based on the time deviation. In some such embodiments, the operations may further comprise: tracking the deviation counter over a specified time period to produce a tracked deviation; and using the tracked deviation in determining the confidence level.

In various embodiments, the plurality of messages from the plurality of external devices may be or include: a basic safety message (BSM), a cooperative awareness message (CAM), and/or a decentralized environmental Notification Messages (DENM), for example, as used in a V2X ecosystem.

In various embodiments, the device may be an On Board Unit (OBU), an Electronic Control Unit (ECU), or a Road-Side Unit (RSU).

In various embodiments, the device may be configured for installation in a watercraft, an aircraft, a spacecraft, a medical device, a robot, a drone, a wireless communication module, a wired communication module, an electronic sign, a digital billboard, and/or an Internet of Things (I) device.

In various embodiments, the remedial action may be or include: sending a warning message to a remote device, terminating communications from the device, executing a self-correction algorithm, and/or shutting down the device.

In various embodiments, the local operational data may be or include local position data, the external operational data may include external position data, and the operations may further include: generating an updated local position by updating the local position data in the local operational data based on position information received from a publicly available service; comparing the external position data from each message of the plurality of messages to the updated local position data to determine a position deviation between the updated local position data and the external position data from each message; and in response to determining that the position deviation for a message exceeds a tolerance value, incrementing a deviation counter based on the position deviation. In some such embodiments, the operations may further include: tracking the deviation counter over a specified time period to produce a tracked deviation; and using the tracked deviation for determination of the confidence level.

It is intended that combinations, (including multiple dependent combinations) of the above-described elements and those within the specification have been contemplated by the inventor and may be made, except where otherwise indicated to be contradictory.

BRIEF DESCRIPTION OF THE DRAWINGS

The accompanying drawings, which are incorporated in and constitute a part of this specification, illustrate implementations of the invention and together with the description, serve to explain the principles of the invention. In the figures.

DETAILED DESCRIPTION

Figure 1:
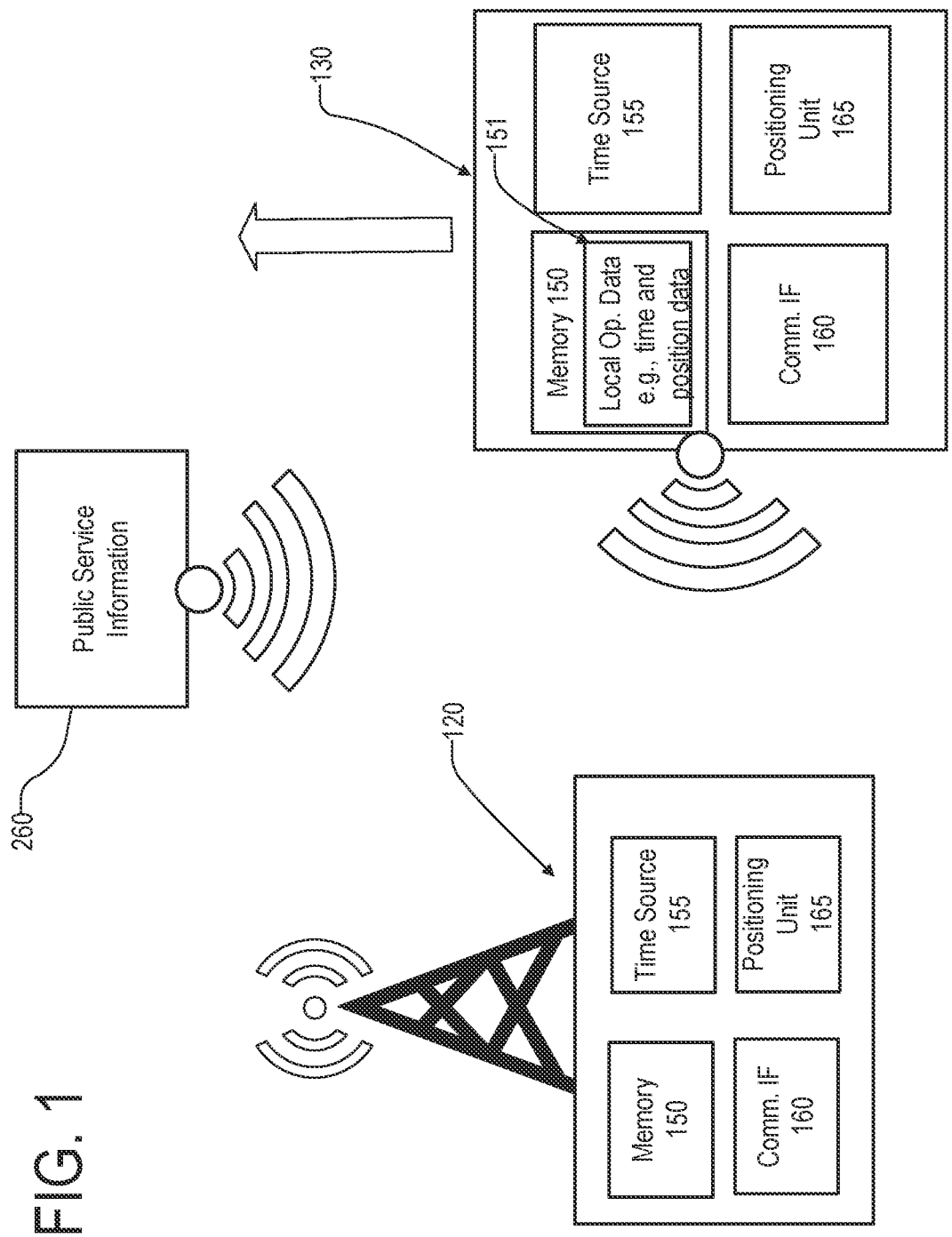
FIG. 1 is a diagram depicting an illustrative configuration of stationary and mobile computerized devices.

Reference will now be made in detail to various implementations of the invention, examples of which are illustrated in the accompanying drawings. Wherever convenient, the same reference numbers will be used throughout the drawings to refer to the same or like parts.

In various implementations, computer-controlled devices can be configured to receive and/or maintain operational data from one or more sources and to use the operational data to perform various tasks associated with the computer-controlled devices. The operational data can be or include, for example, date information, time information, and location information (e.g., longitude and latitude), among others and without limitation to only time and/or location information. The one or more sources of the operational data can be or include a time source of the respective device, over-the-air (OTA) transmission (e.g., a global navigational satellite system (GNSS), a cellular network, etc.), and wired connections (e.g., USB, ethernet, etc.), among others. Importantly, the use of GNSS to describe geographic positioning and localization is not intended to be limiting, and any system suitable for providing information related to global positioning (e.g., a global positioning system (GPS)) is intended to fall within the scope of the present disclosure.

In order to ensure safe and proper operation in the field, computer-controlled devices, (for instance in the V2X ecosystem, the Electronic Control Units (ECUs) and onboard units (OBUs) used in vehicles, and roadside units (RSU) associated with various traffic installations, etc.), must have accurate date/time data and/or location data (also known as position data). When this data becomes compromised, for example, due to a malicious third-party actor (e.g., malefactor) or a hardware malfunction, functioning of the computer-controlled devices can be affected to the point where functioning is unreliable and possible dangerous. It is therefore desirable to determine a confidence level in the operational data to ensure the validity thereof, and in some embodiments to take remedial action to prevent the dissemination of incorrect data when the confidence level is too low.

For example, in the V2X ecosystem, RSUs broadcast GNSS correction data to vehicles so that the vehicles can correct their internally determined position data, which may be off or in error due to various location-determination difficulties associated with vehicles (especially moving vehicles), including difficult environmental conditions, low battery power, satellite signal reflections, etc. It is important that RSUs broadcast accurate location/location data to other devices in the ecosystem, and the various embodiments described herein can detect when an RSU has inaccurate or incorrect position data and may take a remedial action, such as preventing the RSU from broadcasting the incorrect position data to vehicles and other devices.

Messages from mobile devices (e.g., devices in vehicles) typically contain position data, such as the heading and position of mobile device, as well as a time data reflecting the time of message creation. The message from the mobile devices are typically continuously broadcast when the mobile device is operating. Thus, the mobile device's internally calculated time and internally calculated position are continuously supplied in these messages. In accordance with the principles of the invention, because each mobile device independently calculates its internal time and its position, other mobile devices (e.g., OBUs,) and fixed-location devices (e.g., RSUs) can use received messages to determine a confidence level for their local, internally calculated time and/or position, and may act appropriately based on the confidence level.

In this application and in the examples of embodiments disclosed herein, reference will be made to operational data received and/or maintained within Vehicle-to-Vehicle and Vehicle-to-Infrastructure (V2X) devices, which are part of the V2X ecosystem. V2X devices can include, for example, On Board Unit (OBUs), Electronic Control Unit (ECUs), and Roadside Units (RSUs). OBUs and/or devices and subsystems that function similarly are included in many if not all autonomous vehicles, as well as most modern human-controlled vehicles. However, the examples are described in the context of a V2X ecosystem for clarity and ease of explanation—the invention is not limited to V2X ecosystems and the implementations described herein are not limited to V2X devices. The disclosed principles can be applied to other types of computer-controlled devices. For example, in additional or alternative implementations, establishment of confidence levels in operational data received and maintained by a device can be used to ensure proper functioning of other computerized devices. In various implementations, the OBUs and ECUs (or similar computerized devices) can be configured to be installed into vehicles, including autonomous vehicles, watercraft (e.g., boats), aircraft (e.g., airplanes and drones), spacecraft, medical devices, robots, wireless or wired communication modules, and IoT devices. Similarly, the RSUs or similar devices can be installed into traffic control devices (e.g., traffic signals), roadside content distribution systems, electronic tolling systems, electronic signage devices, ground-based drone and aircraft control systems, and digital display devices (e.g., electronic billboards), among other things.

As described herein, systems and methods for establishing and verifying a confidence level for the operational data for a computerized device can be implemented to address the technical problems described above. For example, embodiments of the present disclosure can leverage information available from other ecosystem members to establish confidence with regard to local information stored at another ecosystem member. In other words, by "crowd-sourcing" from within the ecosystem, local information can be validated to a desired level of confidence, and where the desired confidence level is not established, remedial action may be taken.

FIG. 1 is an illustrative representation of a stationary computerized device 120 and a mobile computerized device 130, according to embodiments of the present disclosure. Each of the stationary computerized devices 120 and the mobile computerized devices 130 may comprise a processor (not shown), a memory 150, a time source 155, a communications interface 160, and a positioning unit 165, among others. Although various embodiments are described herein in terms of stationary and mobile computing devices 120, 130, the embodiments are not limited to those that include purely stationary and/or purely mobile devices. For example, the mobile devices described herein may stop moving for some periods of time and/or the stationary devices described herein may move for some periods of time, and both may still perform the functions and operations described herein. Generally, a device 120, 130 may communicate as described herein with any other device 120, 130 that is within communication range.

The memory 150 may be any suitable computer-readable storage that may be accessed by a computerized device 120, 130 for purposes of storing and providing information within the computerized device 120, 130, among others. For example, the memory 150 may comprise volatile memory (e.g., RAM), non-volatile memory (e.g., magnetic storage, optical storage, electronic storage, etc.) and any combination thereof.

The memory 150 is configured to store or maintain local (e.g., internal to the device 120, 130) operational data desirable for carrying out functions according to embodiments of the present disclosure, among others. Thus, the memory 150 may function as the device 120's local data source for the local operational data 151. For example, the memory 150 may be configured to store information (e.g., external messages) received by a receiving component of the communications interface 160, geographic location permissions (e.g., received in a digital asset), geographic location information (e.g., as determined or maintained by positioning unit 165, which may calculate or determine its position based on location information from a public information source 260), and/or time information, which can include the date, etc., (e.g., as determined or maintained by the time source 155, which may process location information from a public information source 260), among others.

According to some embodiments, a stationary computerized device 120 may be configured with geographic location permissions corresponding to an installation location of the stationary computerized device 120. In various embodiments, this may be done by configuring a digital certificate that is installed in the stationary computerized device 120 with geo-region information, which may be stored in the memory 150. For example, at least one digital asset, such as an enrollment, pseudonym, or application certificate, provided during provisioning of a stationary computerized device 120, may include information specifying a geo-region in which the computerized device 120 is authorized or allowed to operate. In various embodiments, the geo-region information may specify a geographic area or region in which the computerized device 120 can function properly as part of the ecosystem (e.g., a V2X environment or network.) This geographic region may be referred to as the "allowed geo-region" of the computerized device 120, and examples include regions such as a specific country (e.g., U.S.A.), state(s) (e.g., Virginia or the New England states), counties (e.g., Fairfax County, Virginia), city (e.g., Richmond, Virginia) or within some other geographic territory or region defined by coordinates, boundaries, or the like. In such embodiments, the computerized device 120 may operate, function, and/or cooperate properly with other devices in the ecosystem (e.g., in the V2X environment) only in the allowed geo-region.

In various embodiments, a digital asset (e.g., digital certificate) may specify a large "allowed" geographic region for storage in the memory 150, such as a country, a group of states, or a state, because the computerized device 120 has typically not yet been deployed (e.g., it is still in the manufacturing phase) at the time when the digital certificate is provided, and thus the exact future operational location of the computerized device 120 may not yet be certain. However, geographic location information may be updated throughout the life of the stationary computerized device 120, as well as that of a mobile computerized device 130, based on reception of information from, for example, a public information service 260 providing navigational information via data broadcast (e.g., via positioning unit 165.)

In some embodiments, the memory 150 may be shared among components of the device, and may therefore, be configured to operate as a memory for the processor (not shown) to perform operations associated with functioning of the associated computerized device 120, 130. Alternatively, the memory 150 may be a dedicated memory for storing information associated with establishing a confidence level in operational data, while other data and information is stored elsewhere for access by the computerized device 120, 130. Thus, the memory 150 may be accessed by any of one or more components of the computerized device 120, 130 (e.g., the processor, the communications interface 160, etc.) for purposes of providing information for establishing the confidence level of a date/time and/or location of the computerized device 120, 130. In some embodiments, the time source 155 and other operational data may be part of, stored in, and/or maintained in the memory 155. For example, local time data for the stationary computerized device 120 may be maintained and/or stored in the memory 150, and similarly local position data for the stationary computerized device 120 may be maintained and/or stored in the memory 150.

In various embodiments, the time source 155 is configured to maintain a local date and/or time for each respective computerized device 120, 130 to enable access by one or more applications executing on the computerized device 120, 130 to determine the current local time, which may include date information. For example, the computerized device 120, 130 may receive one or more OTA updates including a time window indicating a validity period for the OTA update. The computerized device 120, 130 may be configured to process the local date and time as maintained by the computerized device to determine whether if falls within the validity period specified by the OTA update.

According to some embodiments, the time source 155 of a computerized device 120, 130 may be initially set with a local date and time for the computerized device 120, 130, for example, during provisioning. This initial information may then be stored in the memory 150 as internal time data, and the time source 155 may then begin to update the value of the date and time based on the internal time keeping system (e.g., by manipulating a value stored in the memory 150). For example, the time source 155 may include one or more oscillators designed to track passage of time since a last update of the memory 150 and to determine a local time for the computerized device 120, 130 by adding the incremented time as measured by the oscillator (e.g., by incrementing a counter) to the internal time data stored in the memory 150. Thus, based on the last memory update, the processor of the computerized device may add the incremented time to determine a current time.

According to some embodiments, the computerized device 120, 130 may be provided with a date and time via broadcast data received from a public information service 260 (e.g., GNSS, GPS, etc.), and the computerized device 120, 130 may store the date and time in the memory 150 for access by one or more components of the computerized device 120, 130. For example, information contained in a broadcast from a GNSS includes date and time data enabling a receiving device to determine an actual external time according to the GNSS. The time information in the broadcast data may thus be received, processed, and used to update the time source 155 with time information as received by the GNSS.

Notably, and as explained below, depending on a confidence level established according to embodiments of the present disclosure regarding the local date and time maintained by the time source 155 of the computerized device 120, 130, the local date and time may be disregarded, and remedial action triggered to correct the local date and time data. In other words, if the device 120, 130 determines, based on external information, that its local date and time information are inaccurate or incorrect, the device 120, 130 may perform operations to correct its local date and time information. Although various embodiments described herein refer to "date and time" information, it should be understood that the time information and the date information may be separate from each other and processed separately in some embodiments.

The communications interface 160 may include one or more receivers and/or one or more transmitters, among others. The receiver may be configured for wireless (e.g., WiFi, Bluetooth, cellular, etc.) and/or wired (e.g., ethernet, USB, Serial COM, etc.) reception of information. For example, the receiver may include one or more radio receivers for receiving wireless messages sent from ecosystem members (e.g., mobile computerized devices 130), including, for example in the context of the v2X ecosystem, basic safety messages (BSMs), cooperative awareness messages (CAM), and decentralized environmental notification messages (DENM), among others.

According to some embodiments, one of the receivers of the communications interface 160 may be configured to receive location/position information from the public information service 260 (e.g., a GNSS) for providing to positioning unit 165 for use in determining of the location of the computerized device 120, 130. For example, a receiver of the communication interface 160 may be configured to receive GNSS broadcast information and to provide such information to positioning unit 165, among others, to enable determination of, for example, longitude and latitude of the computerized device 120, 130, which may be based on the received GNSS broadcast information.

A transmitter portion of the communications interface 160, when provided, may include a transmitter configured to wirelessly transmit information from the respective computerized device 120, 130. For example, a first transmitter may be configured to transmit the BSM, CAM, and DENM, as well as other messages associated with the ecosystem.

Additionally, the transmitter portion of the communications interface may include a second transmitter for sending information related to functionality associated with the computerized device 120, 130, e.g., traffic control signals, etc. Such functionality may also be provided by the first transmitter where desired, such that a second transmitter may or may not be implemented.

Positional unit 165 is configured to obtain broadcasted location information received by the communications interface 160 and to determine based thereon, a geographic location of the respective computerized device 120, 130. For example, a receiver of the communications interface 160 may receive GNSS broadcast data, and use information received in the GNSS broadcast data to determine a geographic location (e.g., longitude and latitude) of the computerized device 120, 130, as well as, where desired, obtaining date and time data from the same broadcast data.

Positional unit 165 may be configured to update one or more portions of the memory 150 based on information obtained by positional unit 165. For example, the positional unit 165, upon receiving broadcast information from a GNSS may determine the location information, e.g., a coordinate pair indicated latitude and longitude, and store the internally determined location information in the memory 150. In various embodiments, this updating may occur on a periodic or real-time basis, for example, depending on the installation location of the computerized device 120, 130.

As noted above, the positional unit 165 may also be configured to process, e.g., parse, date and time information from the GNSS broadcast, and to provide that information to the time source 155. The time source 155 may in turn update the memory 150 (i.e., the memory location at which local time is maintained) such that local time maintained by the time source 155 matches the time received in the broadcast information, (e.g., time syncing to the broadcast time info).

Figure 2:
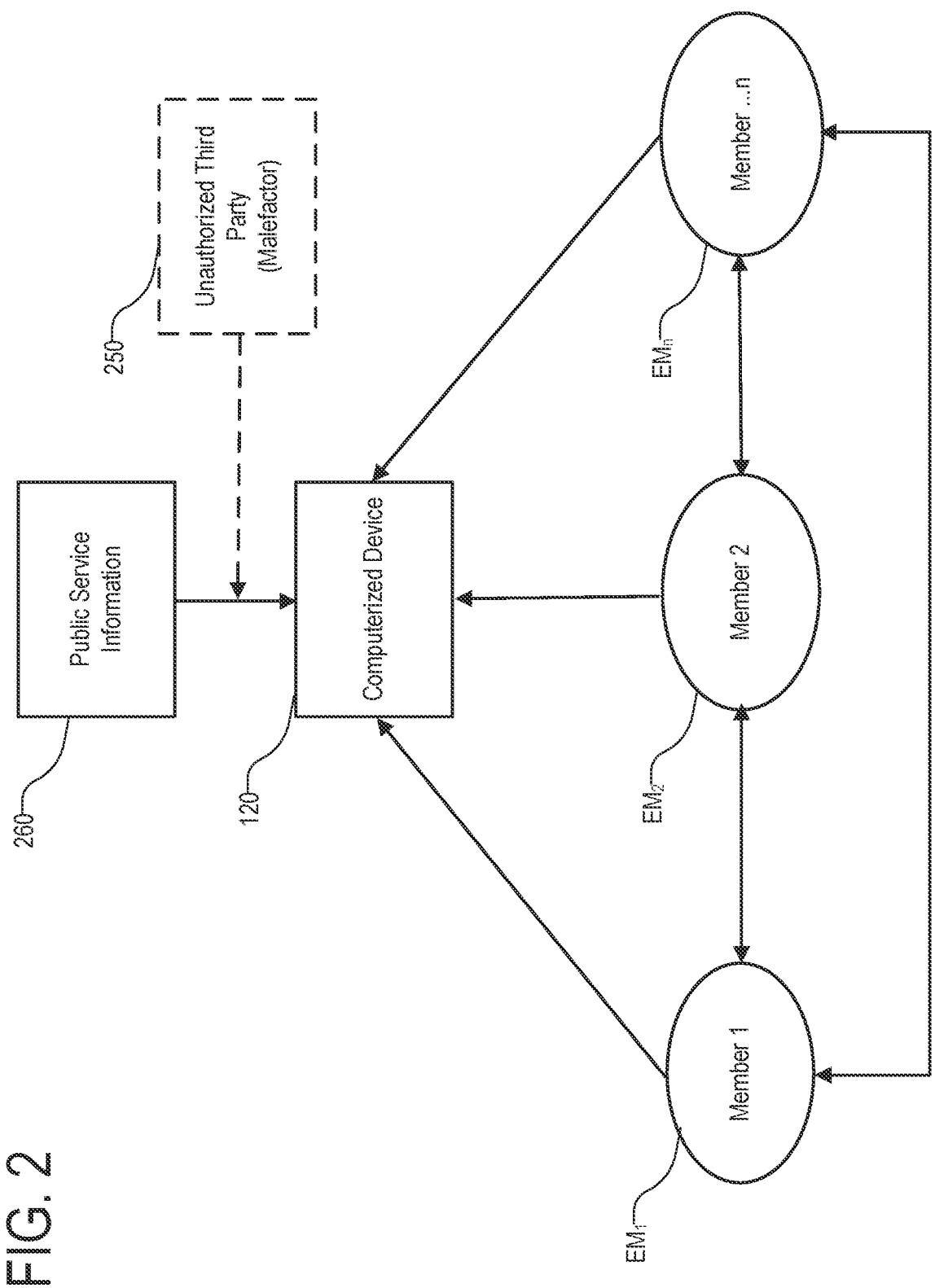
FIG. 2 is an illustrative schematic of a system according to embodiments of the present disclosure.

FIG. 2 is an illustrative schematic showing examples of communications that may occur with regard to a stationary computerized device 120. As shown in the embodiment of FIG. 2, a stationary computerized device 120 may be configured to receive a plurality of messages that are transmitted from the respective ecosystem members $EM_1$, $EM_2$ . . . , $EM_n$. Notably, for purposes of explaining an embodiment of the system herein, a computerized device 120, 130 may become an ecosystem member EM upon obtaining the proper credential, such as a digital certificate, (e.g., an enrollment certificate), issued by an authority of the ecosystem. The enrollment certificate may act as a public key certificate that identifies its holder as an authorized participant/member in the ecosystem, in which all participants must share valid enrollment certificates, (such as, for example, the USDOT-supported V2X ecosystem). Because the enrollment certificate permits communications within the ecosystem, a computerized device 120, 130 thus provisioned becomes an authorized participant within the ecosystem, and enables receipt of other certificates, e.g., pseudonym certificates, that enable communication and operation of a computerized device 120, 130 within the ecosystem (e.g., communications and operations between vehicles and roadside infrastructure in the example of the V2X ecosystem). Thus, in the context of the present disclosure, unless otherwise noted, it is assumed that the computerized devices 120, 130 discussed have been provisioned with a digital certificate enabling membership and operation within the ecosystem.

Each ecosystem member $EM_n$ corresponds to either a mobile computerized device 130 or a stationary computerized device 120, and is configured to communicate (e.g., send and receive information) within the ecosystem in which they operate. For example, each of the ecosystem members $EM_{1 \ldots n}$ may receive broadcast information from a public information service 260 (e.g., GNSS, cellular traffic data, etc.), the broadcast information providing, among others, date, time, and location data. The public information may enable each ecosystem member $EM_{1 \ldots n}$ to determine a date, a time, and a geographic position of the respective computerized device, for example, using the positioning unit 165 and the processor. The broadcast information provided by the public information service 260 may be unsigned and unencrypted, thereby allowing any computerized device to receive and use the information contained within the broadcast without use of a key, certificate, or other digital asset used for secure communication. In some embodiments, the broadcast information provided by the public information service 260 may be digitally signed, such that the receiving computerized device can verifying the authenticity of the information before using it. In some embodiments, the broadcast information provided by the public information service 260 may be encrypted such that only computerized devices that are able to decrypt the information can use it.

Ecosystem members $EM_{1 \ldots n}$ may communicate among one another to provide and share information desirable for safely carrying out functions within the ecosystem e.g., autonomous driving and navigation in the V2X ecosystem. For example, within an ecosystem each of the computerized devices 120, 130 (e.g., ECUs, OBUs, RSU, etc.) may be configured to broadcast one or more messages at a specific frequency. For example, BSMs may be broadcast by each vehicle that is a member of a V2X ecosystem, the broadcasts occurring at a predetermined frequency (e.g., 10 messages per second).

As noted, each message sent and received among the ecosystem members $EM_{1 \ldots n}$ may be digitally signed (and in some cases, encrypted) based on digital assets (e.g., enrollment certificates, pseudonym certificates, etc.) provisioned to each of the ecosystem members $EM_{1 \ldots n}$ within the ecosystem. For example, to enable only verified, trusted, and participating ecosystem members $EM_{1 \ldots n}$ to validate a message from another ecosystem member $EM_{1 \ldots n}$ and to obtain the sensitive data therein, each message (e.g., a BSM, CAM, etc.) may be cryptographically signed using a key associated with a digital certificate provisioned to the respective device. A receiving ecosystem member $EM_{1...n}$ may then optionally decrypt (if needed) the message and obtain the data comprised therein using the respective key provided via a digital asset provisioned to the receiving device. As indicated, a message may be sent signed, but unencrypted in some embodiments (e.g., in the V2X ecosystem). Because of the digital signing, the messages received by each ecosystem member $EM_{1...n}$ can be considered secure and verifiable.

Based on these messages, the stationary computerized device 120 (as well as the mobile computerized devices 130) may receive the messages sent between ecosystem members $EM_{1...n}$ and determine situational data based on information contained in the messages exchanged between the ecosystem members $EM_{1...n}$. For example, each of the messages exchanged between the ecosystem members $EM_{1...n}$ may include date and time data, as well as geographic location data for the respective computerized device 130, among others.

As shown at FIG. 2, in some instances, the broadcast data from the public information service 260 may be any combination of signed, unsigned, unencrypted, and/or weakly encrypted. In the case of unsigned and unencrypted or weakly encrypted, a sophisticated bad actor could spoof the broadcast data fairly easily, and a third-party malefactor 250 may attempt to impersonate or imitate the public information service 260 and to inject incorrect data into the data broadcast by the public information service 260. Thus, the unauthorized third party 250 may spoof the devices receiving its incorrect data such that the devices believe they are receiving legitimate data from the public information service 260, particularly as regards a stationary computerized device 120 receiving location and/or time information. For example, the third-party malefactor 250 may attempt to modify date, time, and/or geographic location information received by the computerized device 120, with the intent of "drawing off" the local information stored within the stationary computerized device 120. The malefactor 250 may attempt to draw off the stationary computerized device slowly, by sending information that deviates only slightly from actual information (e.g., time deviations of a few milliseconds or position deviations of a few centimeters) and may continue to do so over time until the local time stored at the stationary computerized device 120 deviates significantly from the actual time or location provided by the public information service 260.

Similarly, it may be possible for the malefactor 250 to falsely modify, corrupt, or detrimentally change location information provided to a computerized device 120, such that over time, the information stored in the respective computerized device indicates that the computerized device is in a different location than its actual physical location. This location spoofing could go as far as indicating that the computerized device 120 has left its permitted geographical region, such that the computerized device 120 ceases to operate properly (e.g., shuts itself down).

Figure 3:
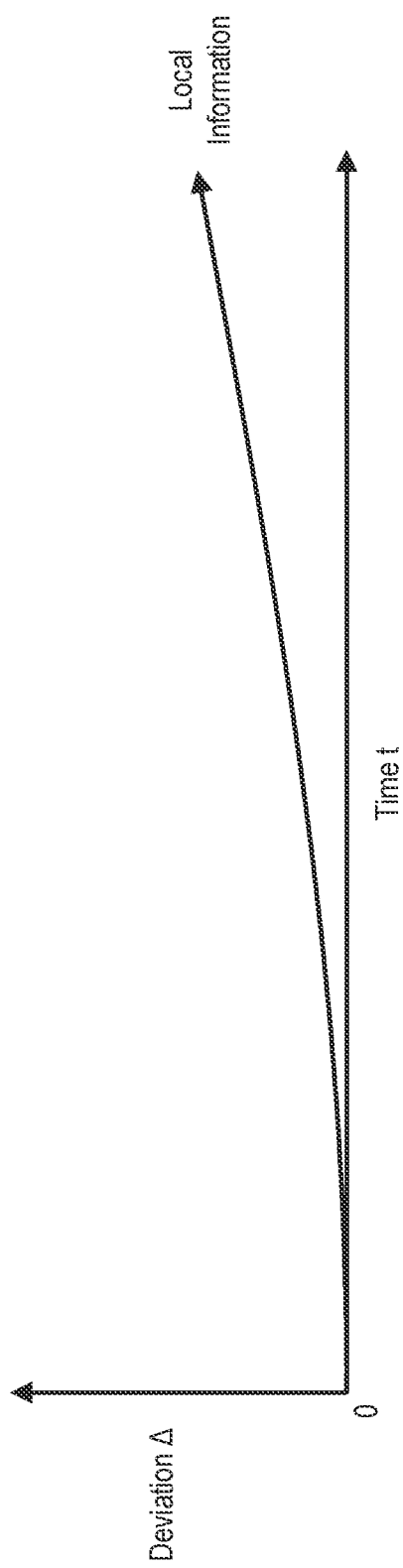
FIG. 3 is a chart showing an example of how local operational data may deviate from actual information, which may be based on one or more erroneous messages received from an external device.

FIG. 3 is a graph showing how the local information (e.g., date, time, location) of a computerized device 120, 130 may deviate from the actual, accurate information provided by the public information service 260, which may be caused by erroneous messages received over time from a malefactor 250. As can be seen, while the initial deviation $\Delta$ in the local information (starting from time t=0) is small, the deviation $\Delta$ can become significantly greater over time, depending on the information injected into the system by the malefactor 250. Large deviations in date, time, and/or position data can then lead to incorrect operation, dangerous inaccuracies, and even shut down of a computerized device 120, 130, which can in turn lead to security and safety issues throughout the ecosystem. For example, if a self-driving vehicle relies on erroneous location information provided by the unauthorized third party malefactor 250, it may steer into another vehicle, a roadside unit, roadway infrastructure, or the like because of the erroneous location information.

Figure 4:
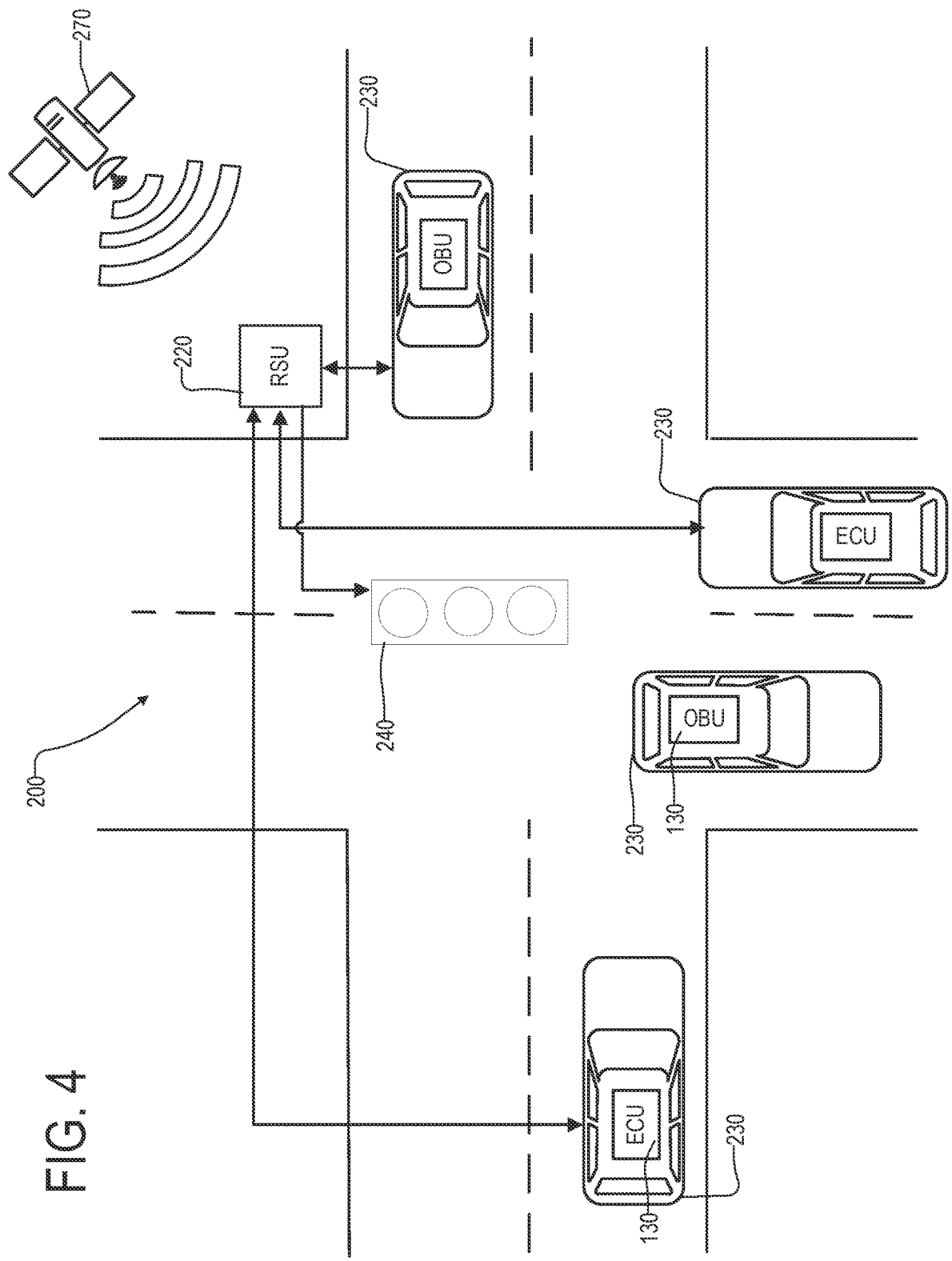
FIG. 4 is a diagram depicting an illustrative roadway intersection where one or more computerized devices may be present, consistent with disclosed implementations.

FIG. 4 is a diagram depicting an illustrative roadway intersection 200 where one or more computerized devices 120, 130 may be present, consistent with an exemplary implementation of the present systems and methods. For ease and clarity of description, the operation of the systems and methods of the present disclosure are often described with regard to a V2X ecosystem that includes at least one RSU 220 having a stationary computerized device 120 and a plurality of vehicles 230, each of which including a mobile computerized device 130, for example, an OBU and/or an ECU. In the embodiment of FIG. 2, an illustrative GNSS 270 configured to provide broadcast information including navigational and time related data acts as the public information service 260.

According to this example, RSUs 220 may be present at various locations along a roadway (e.g., at bridges, intersections, etc.) and may be configured to control one or more features of the roadway, e.g., traffic signals, traffic lighting, bridge operation, etc., as well as be configured to broadcast position data (e.g., position correction data) for use by passing vehicles. One or more mobile computerized devices 130 (e.g., ECUs, OBUs, etc.), which are installed within a vehicle 230 and capable of OTA digitally signed communication for programming/updating, may be present at and/or pass through the intersection 200. The vehicles 230 may for example, stop at one or more traffic signals 240 controlling right of way through the intersection 200, and pass through the intersection 200 when the traffic signal, controlled by RSU 220, permits right of way through the intersection for one or more vehicles 230.

As the vehicles 230 pass through the intersection 200 a variety of messages may be broadcast by the mobile computerized devices 130 of the vehicles 230 and received by the other vehicles 230 that are in proximity, as well as by the RSU 220. Although the messages sent by the vehicles 230 may not be specifically intended for the RSU 220, the RSU 220 may obtain any of the emitted messages based on known V2X communication protocols. As noted above, these messages may include BSMs, CAMs, and DENMs, among others. Each of the messages emitted by the mobile computerized devices 130 may include various information related to operation of the V2X network, including, for example, the date and time, velocity and location of the vehicle 230 from which a respective message was emitted, etc. In various embodiments, the mobile computerized devices 130 installed in the vehicles 230 may receive broadcast information from the GNSS 270, and the broadcast information may enable the mobile computerized device 130 installed in the vehicle 230 to determine its location and local date and time information in real time (i.e., without substantial delay or lag, such as within 20, 10, 6, 3, or 0.5 milliseconds, or less, of reception), among others. Each of the messages subsequently emitted by a respective computerized device 130 may then include the local time and location of the emitting computerized device 130, which may be referred to as external time data and external location/position data, when discussed with respect to another computerized device, e.g., RSU 220.

As noted above, the RSU(s) 220 may broadcast position correction data to passing vehicles 230, which the vehicles 230 may use adjust their GNSS-determined location and to inform features such as autonomous driving. Thus, it is important that the position correction data broadcasted by the RSU(s) 220 (and/or by any other members of the ecosystem) be accurate, so as to avoid collisions and other negative consequences that may occur when a vehicle 230 has an inaccurate calculation as to its position.

Thus, any of the computerized devices 120, 130 within reception range of other ecosystem members $EM_{1...n}$ is able to obtain signed, verifiable information from the other ecosystem members $EM_{1...n}$ and use such information for establishing a confidence level in its own local operational data 151.

Figure 5:
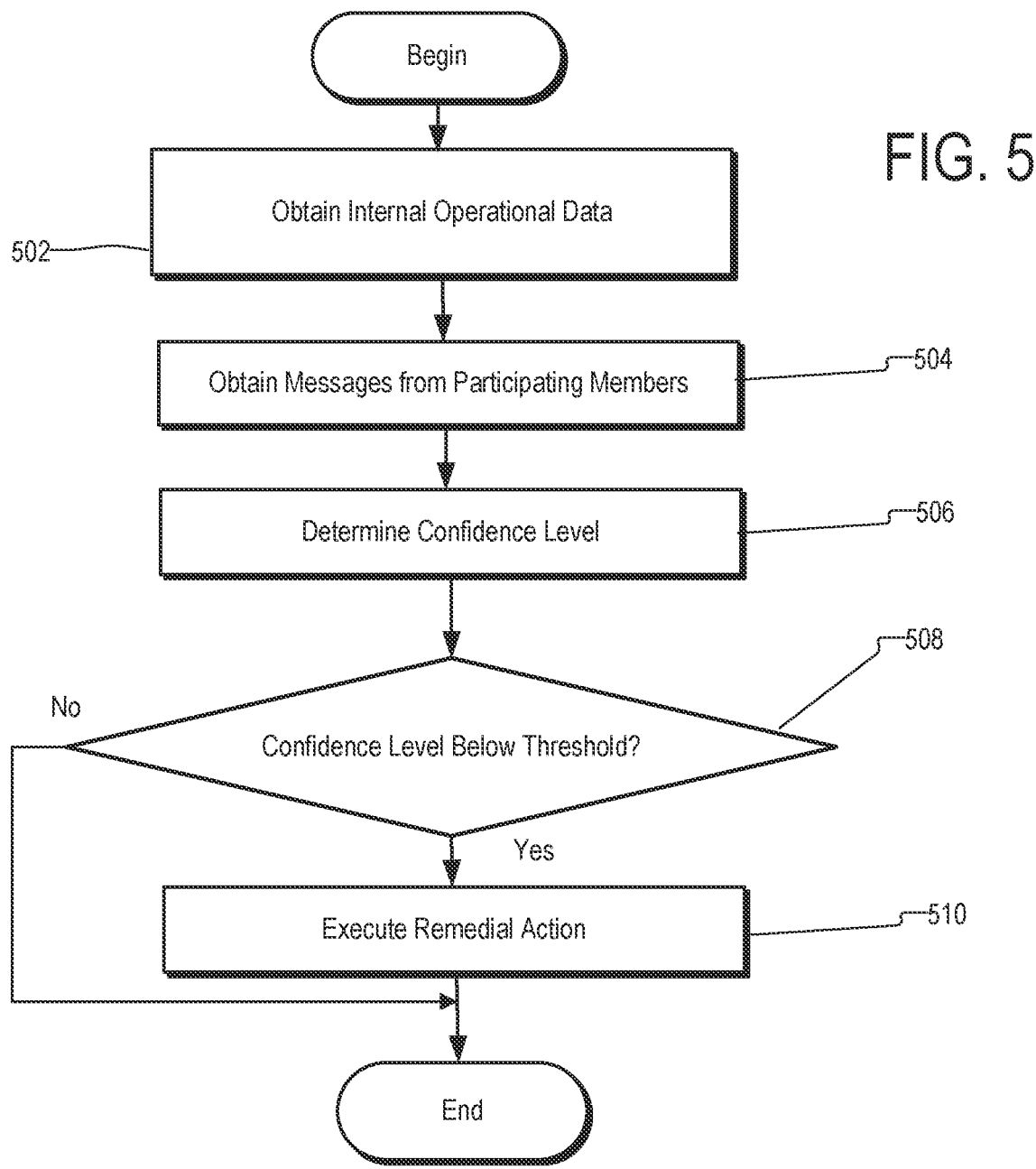
FIG. 5 is a flowchart depicting an illustrative set of operations for monitoring the local operational data for a computerized device.

FIG. 5 is a flowchart depicting an illustrative set of operations (e.g., a process or method) for monitoring the local operational data 151 for a computerized device, and for taking corrective action should the local operational data 151 become compromised (e.g., by a third-party malefactor 250, or the like). In various embodiments, the operations shown in FIG. 5 may be performed by the processor, software, and other hardware of a computerized device 120, 130. As an initial matter, a computerized device may be configured to carry out a "confidence check" of local operational data 151 at a specific or predetermined interval (e.g., every 5 minutes, every hour, every 24 hours, etc.) and/or may base a confidence check frequency on availability of external data messages from ecosystem members $EM_{1...n}$, among others. For example, during certain periods throughout a day (e.g., late night periods), there may be few to no ecosystem members $EM_{1...n}$ within reception range of a particular stationary computerized device 120. During other periods of the day (e.g., rush hour) there may be many ecosystem members $EM_{1...n}$ within reception range of the stationary computerized device. Therefore, due to the larger amount of external data available to compute a confidence level accurately, the stationary computerized device 120 may carry out a greater number of confidence checks during periods with many ecosystem members $EM_{1...n}$ (e.g., during rush hour) than during times of fewer members (e.g., at 2 a.m.).

As shown in the example of FIG. 5, when a confidence check begins, the computerized device 120, 130 may first obtain the local operational data 151 (e.g., data that the device stores and uses internally during operation) that it intends to validate, for example, the local operational data 151 corresponding to date, time, and/or location (operation 502). Thus, where date and/or time is to be checked, for example, the internal time source 155 may be requested to provide internal time data representing the local time for the computerized device 120, 130. Internal date and/or time may be obtained, for example, from the memory 150 and/or by obtaining time data from broadcast information obtained from the public information service 260. Alternatively, or in addition, the internal time source 155 may use information stored at memory 150 and data associated with the oscillator of the internal time source 155 to obtain internal time data representing the local time for the computerized device 120, 130.

The computerized device 120, 130 may then obtain, for example, via the communication interface 160, a plurality of messages (e.g., signed and encrypted) from ecosystem members $EM_{1...n}$, which are within reception range of the computerized device 120, 130 performing the confidence check (operation 504). For example, in the context of the RSU 220 of FIG. 4, the RSU 220 may obtain a plurality of messages from the four vehicles 230 positioned around the intersection 200, and communicating with one another within the V2X ecosystem. Each of the messages (e.g., BSM, CAM, etc.) may contain external operational data from each respective sending computerized device 130 of the four vehicles 230, the external operational data being related to date, time, and/or location, among others. The operational data from the four vehicles 230 is "external" from the point of view of RSU 220 that is receiving the data. The RSU 220 of FIG. 4 may obtain such messages incidentally, such as where the messages are not intended directly for the RSU 220, yet, because RSU 220 is within reception range, it may wirelessly receive the messages, and obtain the external operational data contained therein.

Once again, continuing with date/time as an example, each message received from an ecosystem member $EM_{1...n}$ may be processed (e.g., decrypted and parsed) by the computerized device 120, 130 that is performing the confidence check, and external time data may be extracted from predetermined fields of the respective messages. For example, a BSM may include date and time information in a second field of the message, while latitude and longitude may be represented at additional, respective fields of the message.

Once the computerized device 120, 130 performing the confidence check has obtained the external operational data (e.g., external time data) from one or more messages received from ecosystem members $EM_{1...n}$, a confidence in the local operational data 151 (e.g., local time data or local position data) may be calculated or determined based thereon (operation 506).

Figure 6:
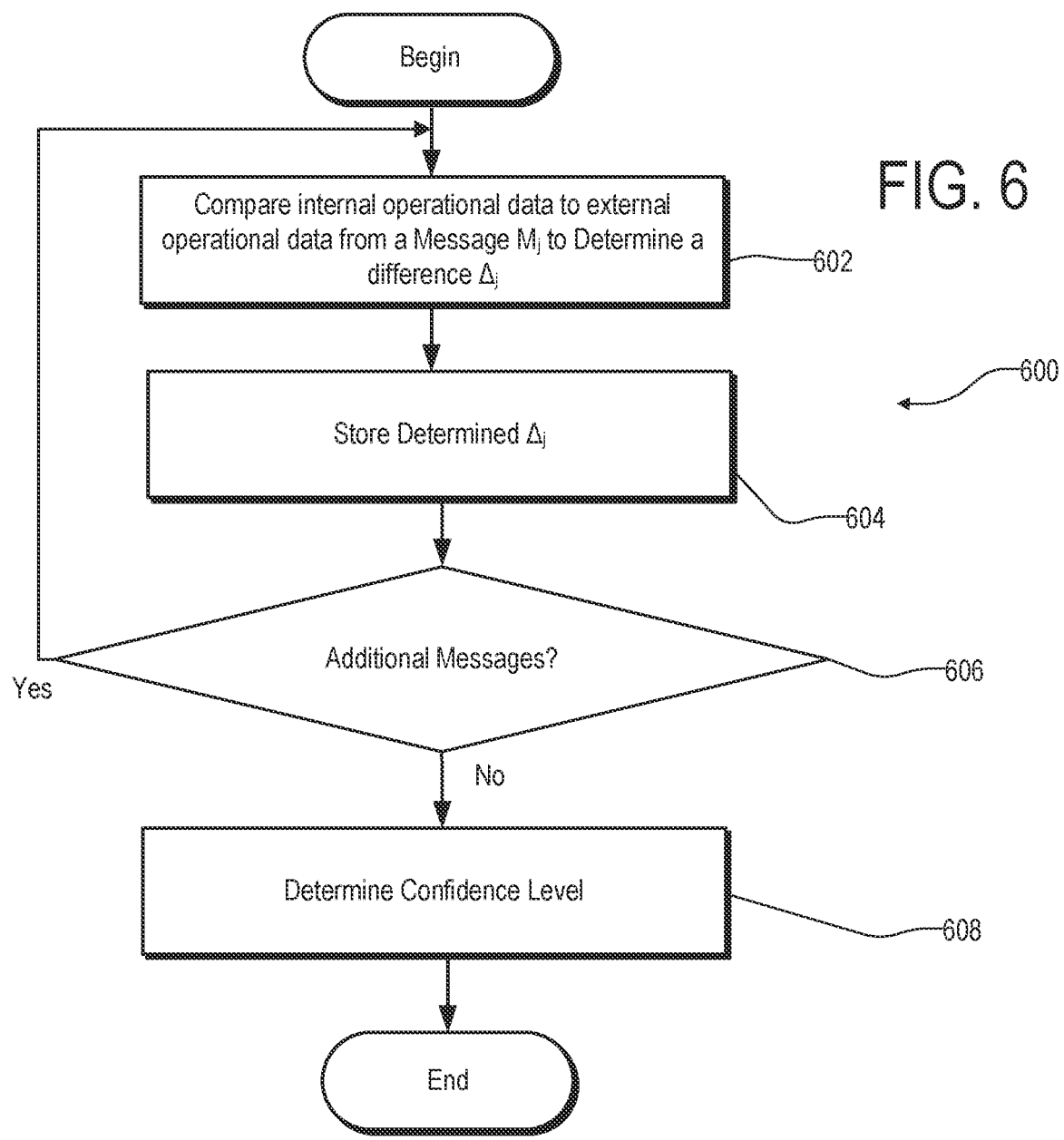
FIG. 6 is a flowchart depicting an illustrative set of operations for establishing a confidence level for local time operational data based on external information.

At this time, turn to consideration of FIG. 6, which is a flowchart 600 showing an illustrative set of operations for establishing a confidence level for local time or position data based on a plurality of messages comprising external operational data. In various implementations, FIG. 6 may be considered to correspond to one illustrative implementation of operation 506 of FIG. 5.

As shown in the example of FIG. 6, for each message $M_j$ of a collection of messages received from ecosystem members $EM_{1...n}$, the local (e.g., internal) operational data may be compared to the external operational data to determine whether a deviation or difference Δ (delta) between the two exists (operation 602). For example, where time data is being compared, the local operational data 151 corresponding to the local time of the computerized device performing the confidence check may be compared to the external operational data from the message $M_j$, which corresponds to the external time at which the message $M_j$ was sent by the ecosystem member $EM_n$. The difference between these values, if any, may be regarded as the deviation $\Delta_j$ for the message $M_j$.

The determined deviation $\Delta_j$, may then be stored (e.g., temporarily) in, for example, memory 150 for future use (operation 604). In some embodiments, if there was no deviation for message $M_j$, (e.g., if the internal and external time values match each other), then the process of FIG. 6 may store data representing no deviation (e.g., store a deviation value of zero).

Following storage of the determined deviation $\Delta_j$, it is determined whether the loop end condition is met; in the embodiment shown, the process 600 determines whether additional messages exist (operation 606). Where additional messages exist (operation 606: yes), operations 602 and 604 are repeated so that the additional messages may be processed and any deviations $\Delta_j$ stored. When no further messages exist, (operation 606: no), the process continues to operation 608.

According to some embodiments, as a loop end condition, the operation 606 may determine whether or not operations 602 and 604 have processed less than a specific sample size of messages (e.g., 5 messages, 10 messages, 20 messages, 30 messages, 50 messages, 100 messages, 200 messages, 1000 messages, or the like), and may proceed to operation 608 when the sample size has been reached. This may be desirable in a busy V2X ecosystem in which most vehicles have an OBU and the message frequency is mostly continuous (and rarely intermittent), such that the process 600 can typically perform its function on a statistically sampled basis. In some similar embodiments, process 600 may perform its function every minute using a predetermined sample size (e.g., 50) of the most recent messages it has received by the end of each minute.

According to some embodiments, as a loop end condition at 606, the process 600 may use whatever number of messages are collected during a specific time period. For example, a collection or sample of messages used for establishing the confidence level of local operational data 151 may be taken for a specific time period relative to the commencement of the confidence level check. For example, the time period may be between 1 and 2 seconds prior to commencing the confidence level check to between 1 and 2 seconds after commencing the confidence level check. In various embodiments, the time period may be set based on the frequency of one or more message types in the ecosystem. For example, a predetermined time period of 1 second, 2 seconds, or 3 seconds may be appropriate in a V2X ecosystem where BSMs are transmitted at a frequency of approximately 10 Hertz. This time period may be dynamically adjusted according to how many different computerized devices 120, 130 are broadcasting BSMs—the more different computerized devices there are, the shorter the time period can be.

The above-described specific time periods are not intended to be limiting, and any suitable time period allowing performance of a comparison of values may be used, such as plus or minus: 0.2 second, 0.5 second, 1 second, 2 seconds, 5 seconds, 10 seconds, 30 seconds, 1 minute, 3 minutes, 5 minutes, 15 minutes, or the like. Alternatively, or in addition, the comparison 602 and storing 604 may be performed as messages are obtained by the computerized device 120, 130 performing the check. In other words, operation 606 may be eliminated such that each received message from an ecosystem participant may trigger a confidence level check. Alternatively, or in addition, the obtained messages may be processed in batches and a time offset applied for the comparison based on the batch processing.

The confidence level may then be calculated or determined based on the collection of stored deviations (operation 608). As an initial example, and according to some embodiments, the confidence level may be expressed as a percentage where the percentage is calculated as the percentage of messages with a deviation $\Delta_j$ equal to zero. Considering such an example, when 90 percent of the determined deviations $\Delta_j$ are equal to zero, i.e., no deviation, a confidence level of 90 percent may be established for the operational data being checked. Similarly, where 40 percent of the determined deviations are equal to zero, a confidence level of 40 percent may be established. In some similar embodiments, the percentage is calculated as the percentage of messages with a deviation $\Delta_j$ equal to zero plus or minus a tolerance amount, such as 5 milliseconds, 3 milliseconds, 1 millisecond, 0.5 millisecond, 0.1 millisecond, 0.01 millisecond, or less. For example, in the case of a tolerance of 0.5 milliseconds, if the system receives 10 external device messages and seven of the external time data values contained in those 10 messages are within +/−0.5 msec of the system's internal operational time data value, (i.e., three of the external time data values have a deviation $\Delta$ more than +/−0.5 msec from the system's internal operational time data value), then the system will calculate or determine the confidence level to be 70%. In various embodiments, similar processing may be performed for location data, where the tolerance amount may be 5 meters, 3 meters, 1 meter, 50 centimeters, 10 centimeters, 5 centimeters, 3 centimeters, 1 centimeter, or less.

As another example, and according to some embodiments, an average deviation $\Delta_{avg}$ may be determined and used as the basis for determining a confidence level for the local operational data 151. In such embodiments, the determined average deviation $\Delta_{avg}$ across all messages for a particular confidence check may be compared to values, for example, in a lookup table stored in memory 150, to determine a correlated confidence level associated with the average deviation $\Delta_{avg}$. For example, using a time confidence check as an example, where the average deviation $\Delta_{avg}$ is determined to be zero, the confidence level may be determined to be 100 percent, while an average deviation $\Delta_{avg}$ in the range of zero +/−0.1 millisecond may equate to a confidence level of 95 percent; an average deviation $\Delta_{avg}$ in the range of zero +/−0.2 millisecond may equate to a confidence level of 90 percent, etc. The ranges associated with a particular confidence level may be set as desired based on a particular application without deviating from the scope of the present disclosure, including non-linear correspondences between ranges and confidence levels. In various embodiments, similar processing may be performed for location data, where an average deviation $\Delta_{avg}$ of zero meter correlates with confidence level of 100 percent; an average deviation $\Delta_{avg}$ of 0.001 to 0.01 meter may equate to a confidence level of 98 percent; an average deviation $\Delta_{avg}$ in the range of 0.011 to 0.03 meter may equate to a confidence level of 95 percent; an average deviation $\Delta_{avg}$ in the range of 0.011 to 0.1 meter may equate to a confidence level of 90 percent an average deviation $\Delta_{avg}$ in the range of 0.11 to 0.3 meter may equate to a confidence level of 83 percent; etc.

According to still further embodiments, a deviation counter may be implemented, whereby each deviation $\Delta_j$ greater than zero, or outside the range of zero +/−a tolerance value, results in incrementing of a deviation counter by a specific value. For example, where a deviation $\Delta_j$ of time ranges between greater than 0.2 and 1 millisecond, (which may correspond a tolerance of 0.2 millisecond), then the counter may be incremented by 1. Where the time deviation $\Delta_j$ ranges between greater than 1 millisecond and 2 milliseconds, the counter may be incremented by 2, and so on. The deviation counter may then be tracked over a specific time period (e.g., 1 hour, 6 hours, 12 hours, etc.) to determine a final value of the deviation counter at the end of the time period (e.g., a tracked deviation). In some embodiments, the time period may be a rolling time period, e.g., the counter value calculated for the last 12 hours. The confidence level may then be determined based on a value of the deviation counter by, for example, using a lookup table correlating the counter value to a respective confidence level. For instance, a deviation counter value of 0 (e.g., the sum of tracked deviation values over the time period is 0) may correlate to a confidence level of 100%; a deviation counter value of 0 may correlate to a confidence level of 100%; a deviation counter value of 1-10 may correlate to a confidence level of 95%; a deviation counter value of 11-15 may correlate to a confidence level of 90%; a deviation counter value of 16-20 may correlate to a confidence level of 80%; etc. In various embodiments, similar processing may be performed for location data—for example, where a deviation $\Delta_j$ of location ranges between greater than 0.05 and 0.2 meter, then the counter may be incremented by 1; where the location deviation $\Delta_j$ ranges between greater than 0.2 and 0.3 meter, the counter may be incremented by 2, and the like.

In some embodiments, the initially determined confidence level may be varied or adjusted based on the sources of the messages used by operation 608. For instance, when the messages originate from a small number or variety of message-source devices (e.g., from less than a minimum threshold number of devices, such as less than: 10 devices, 20 devices, 30 devices, 40 devices, or the like), then the process 600 may reduce or negatively adjust the determined confidence level in operation 608 to reflect the fact that the messages come from a small variety of source devices. The small variety of source devices gives rise to the possibility that the messages (and thus the calculated confidence level) could be predominated, corrupted, or manipulated by messages and data from bad actors (e.g., attackers). This may be the case where the device performing process 600 (e.g., an RSU or OBU) is in a location or situation where the number of nearby vehicles changes slowly or static (e.g., during rush hour or near a red traffic light). In some embodiments, if the number or variety of message-source devices is below a specific threshold, (such as 10 devices, 8 devices, 5 devices, or the like), then the process 600 may suspend the confidence level calculation 608. Alternatively or additionally, the process 600 may increase the data sample size in operation 606 so as to reduce or eliminate the ability of an attacker to corrupt the operational data (e.g., time data and/or location data) of the device performing process 600.

On the other hand, when the messages originate from a large variety of source devices (e.g., from greater than a minimum threshold number of devices, such as greater than: 10 devices, 20 devices, 30 devices, 40 devices, or the like), then the process 600 may make no change or adjustment to the determined confidence level in operation 608 because the fact that the messages (which bear the operational data) come from a large variety of source devices gives confidence that the messages are not predominated, corrupted, or manipulated by messages from malefactors. This may be the case where the device performing process 600 (e.g., an RSU or OBU) is near a large number of message-source vehicles that are in motion such that the nearby vehicles (i.e., message sources) are changing frequently.

Returning to FIG. 5, once the confidence level has been obtained (operation 506), for example, via the methods described at FIG. 6, a determination is made as to whether the confidence level falls below a specified threshold value (operation 508). The threshold value for the confidence level may be preset or determined in any suitable manner for a particular application and/or a particular type or usage of the computerized device that is performing the processes of FIGS. 5 and/or 6, such as, computerized device 120, 130, 220, and/or 230. For example, in a critical application (e.g., where emergency services or self-driving vehicles are involved), and where the confidence level is expressed as a percentage, a threshold confidence level of 95 percent (or higher) may be set. In less critical applications (e.g., in home appliance control applications), a threshold confidence level of 90 or even 80 percent may be considered acceptable. In some embodiments, the threshold for the confidence level may be predetermined before the system operates; while in other embodiments, the threshold for the confidence level may be dynamically calculated and may vary during system operation.

When the confidence level is determined to be above or equal to the threshold value (operation 508: no), the confidence check ends. In various embodiments, the computerized device 120, 130 may then perform another confidence check according to a periodicity set for the computerized device 120, 130.

When the confidence level is determined to be below the threshold value (operation 508: yes), one or more remedial actions may be executed, taken, or triggered by the computerized device 120, 130 (operation 510). According to some embodiments, in response to determining that the confidence level has fallen below the threshold, the computerized device 120, 130 may be configured to perform one or more of: sending a warning message to a remote device, terminating communication, terminating broadcasts, terminating specific functions (e.g., aborting or disabling autonomous driving) executing a self-correction algorithm, resetting its hardware, resetting or recalculating its local operational data 151 (e.g., resetting its internal time data or its internal position data), notifying a human operator, and/or shutting itself down, among other things.

In various embodiments, the remedial actions taken may depend on the severity of the determined confidence level, e.g., how far the confidence level falls below the threshold value. For example, when the confidence level falls less than 5 percent below the threshold confidence level, a computerized device 120, 130 may first send a message, which may be signed and/or encrypted, to a remote monitoring device indicating that the threshold confidence level was not met, and that service is desirable. As another example, when the confidence level falls below the threshold value more than 10 percent, the computerized device may first send a message to the remote monitoring device indicating a serious problem, and then immediately shut itself down to prevent issues arising from the use of inaccurate operational data. For example, if the computerized device performing the process of FIG. 5 is an RSU 220, and the RSU 220 determines that its internal position operational data differs significantly (e.g., by 50M, 75M, 100M or more) from the positions of vehicles 230 that are passing in close proximity (e.g., determines that the confidence level for its internal position operational data is very low), then the RSU 220 may shut itself down so as not to broadcast incorrect positional data to the passing vehicles 230 and/or stop broadcasting and execute a remedial action to correct its internal position operational data.

According to some embodiments, a self-correcting algorithm may be implemented by the computerized device 120, 130, when the confidence level is determined to be below the threshold (508, Yes). For example, the computerized device 120, 130, may be configured to calculate, based on an initial time put into service stored in the memory 150 and information determined from the internal time source 155 (e.g., oscillator information), an approximate real-world time. The computerized device 120, 130 may use this approximate time as a temporary, recalculated self-correction to its operational data while awaiting requested service.

Any other suitable remedial actions are contemplated and intended to fall within the scope of the present disclosure.

In some embodiments, the process may perform one or more additional operation or function (not shown) when the confidence level for the operational data is above the threshold (508, No); i.e., when the process of FIG. 5 determines with a high degree of confidence that the operational data is correct or accurate based on the corresponding data received from other devices in the ecosystem. In such embodiments, the process may create a "checkpoint" that saves the high-confidence operational data (e.g., the high-confidence time data or the high confidence location data that was verified by the process of FIG. 5). The checkpoint may be written periodically (e.g., written every 1, 2, 5, 10, 15, 30, 60, 300, 600, 3,600 seconds, or more) to a nonvolatile storage location (e.g., in a flash/solid state memory, a magnetic storage device, an optical storage device, or the like) and used to confirm that the checkpoint operation data is behaving appropriately. For example, in the case of operation time data, that the time is monotonically increasing; or in the case of location data for a stationary RSU, that the location data is not changing. In some implementations, it may be undesirable to write to solid state device (e.g., flash memory) at a high frequency, e.g., once a second, for long periods of time because the device will wear out quickly. In such implementations, it may be desirable to write the checkpoint data less frequently than every second, but at a frequency that is sufficient to detect drift fairly quickly, such as, every 10 seconds, every 30 seconds, every 60 second, every 300 seconds, or the like. It is desirable (but not necessary) to use a nonvolatile storage location for the checkpoint data because it allows the checkpoint data to remain unchanged through a power-down cycle, which helps prevent an attacker (e.g., malefactor 250) from adversely changing operational data (such time or position data) on power up. Another implementation may use a RAM that has a battery backup to maintain the checkpoint data integrity during a power down, as RAM can be written frequently (e.g., every second or less) without adverse effects. Still other implementations may use both RAM and nonvolatile storage, which may be written at different frequencies appropriate for each.

Although an "end" operation is shown in FIGS. 5 and 6 for ease of understanding, in various embodiments, the processes of FIGS. 5 and 6 are repeated continuously by a computerized device 120, 130 while it is operating. In such embodiments, the processes of FIGS. 5 and 6 continuously gather or obtain messages, take a statistical sample of those messages (e.g., based on a time period, the number of messages, the number of independent message-transmitting devices, a combination of these, or the like), determine the operational data delta for each of the sampled messages, determine a confidence level for the local operational data 151, and optionally take remedial action if the confidence level is low.

One of ordinary skill will recognize that the components, processes, data, operations, and implementation details shown in FIGS. 1-6 are examples presented for conciseness and clarity of explanation. Other components, processes, implementation details, and variations may be used without departing from the principles of the invention, as these example is not intended to be limiting and many variations are possible. For example, various operations could be added, removed, combined, or done in parallel in the processes of FIGS. 5 and 6. For another example, the analysis method used to determine the confidence level (e.g., 506, FIG. 6, 608) and/or the criteria for determining which and/or how many messages to analyze (e.g., 504, 606) may dynamically change, and/or be done in other manners known to those skilled in the art, depending on ecosystem factors such as the number of messages that are obtained, the number of differences stored, how quickly the messages change, how quickly the message-sending devices change, and the like. In general, the more messages that are received, and the more different message-sending devices produce those messages, the more accurate the confidence level calculation will be.

One of ordinary skill will further recognize that although several of the examples and implementation details presented in conjunction with FIGS. 1-6 are in the realm of operational time data, similar functions, calculations, and operations may be performed on operational location data, (as well other types of operational data), within the principles of this disclosure.

Figure 7:
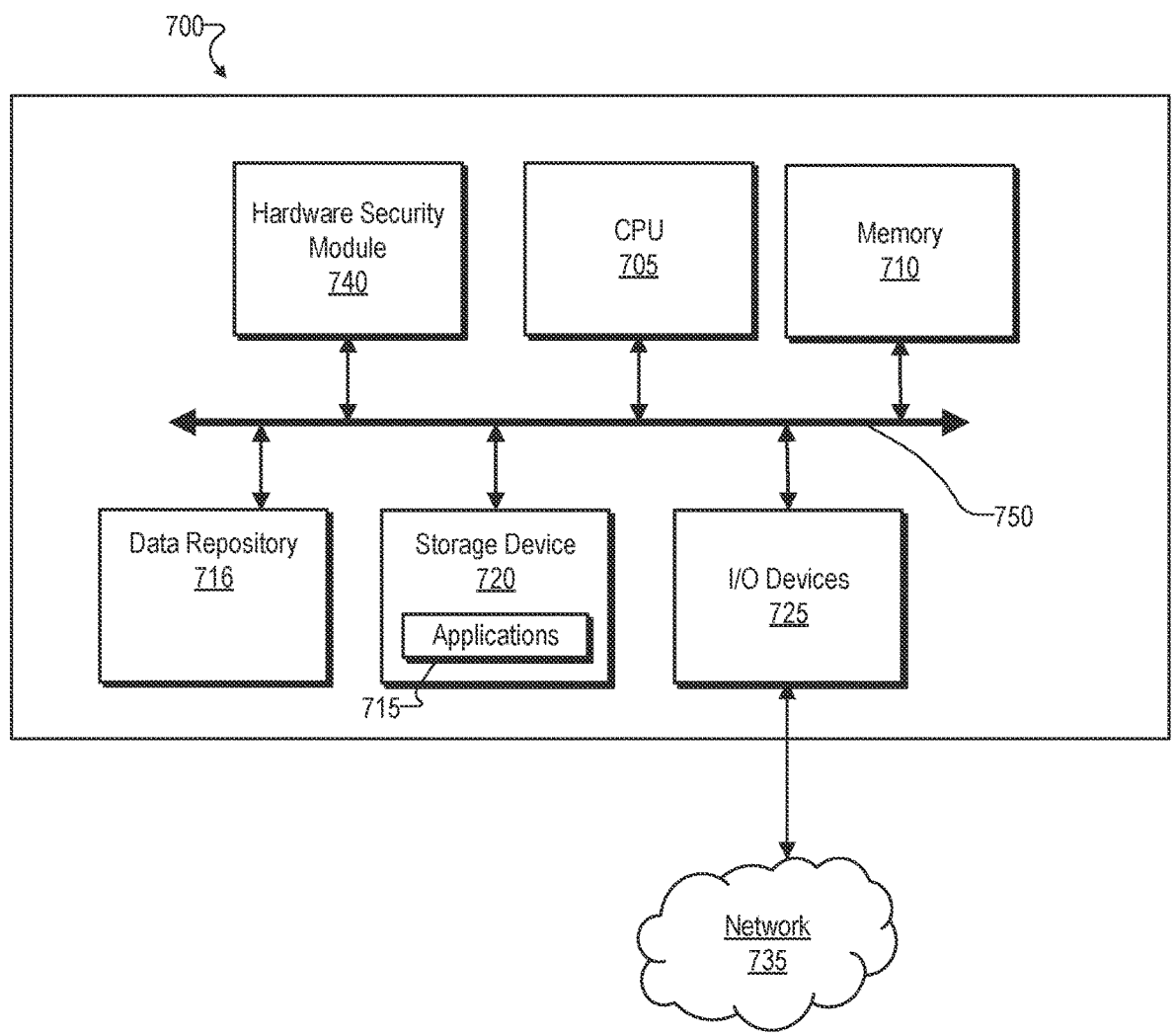
FIG. 7 is a diagram showing an illustrative computerized device on which systems and methods of the present disclosure may be implemented.

FIG. 7 is a diagram showing an illustrative computerized device 700 on which systems and methods and operations of the present disclosure may be implemented. The computing system 700 may be used to implement, at least partially, any of the computerized devices 120, 130, remote monitoring servers (not shown), etc. of the present disclosure, among other things.

In the example shown in FIG. 7, the computing system 700 includes a number of components, such as a CPU 705, a memory 710, an input/output (I/O) device(s) 725, a hardware security module (HSM) 740, and a nonvolatile storage device 720. System 700 can be implemented in various ways. For example, an implementation as an RSU may comprise a CPU 705, a memory 710, a nonvolatile storage 720, and I/O devices 725. In such a configuration, the components 705, 710, 720, and 725 may connect and communicate through a local data bus 750 and may access a data repository 716 (implemented, for example, as a separate data source or a database system) via an external I/O connection. The I/O device(s) 725 may connect to external devices through a direct communication link (e.g., a hardwired or local WiFi connection), through a network, such as a local area network (LAN) or a wide area network (WAN, such as a cellular telephone network or the Internet), and/or through other suitable connections. System 700 may be standalone, or it may be a subsystem of a larger system.

The CPU 705 may be one or more known processor or processing devices, such as a microprocessor from the Core™ family manufactured by the Intel™ Corporation of Santa Clara, CA or a microprocessor from the Athlon™ family manufactured by the AMD™ Corporation of Sunnyvale, CA. CPU 705 could also be an ARM CPU or a proprietary CPU. The memory 710 may be one or more fast storage devices configured to store instructions and information executed or used by the CPU 705 to perform certain functions, methods, and processes related to implementations of the present invention. The memory 710 may correspond, for example, to the memory 150 of a computerized device 120, 130 described above.

The storage 720 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 710 may contain one or more programs or applications 715 loaded from the storage 720 or from a remote system (not shown) that, when executed by the CPU 705, perform various operations, procedures, processes, or methods consistent with the present invention. Alternatively, the CPU 705 may execute one or more programs located remotely from the computing system 700. For example, the computing system 700 may access one or more remote programs via the network 735 that, when executed, perform functions and processes related to implementations of the present invention.

In certain implementations, the memory 710 may include a program(s) 715 for performing the specialized functions and operations described herein for the performing a confidence check on local operational data 151 associated with a computerized device 120, 130. In some implementations, the memory 710 may also include other programs or applications that implement other methods and processes that provide ancillary functionality to the invention.

The memory 710 may also be configured with other programs (not shown) unrelated to the invention and/or an operating system (not shown) that performs several functions well known in the art when executed by the CPU 705. By way of example, the operating system may be Microsoft Windows™, Unix™, Linux™, an Apple Computers™ operating system, or other operating system, including real time operating systems. The choice of operating system, and even to the use of an operating system, is not critical to the invention.

The HSM 740 may be a device with its own processor that securely generates and stores digital security assets and/or securely performs a variety of cryptographic and sensitive computations. The HSM 740 protects digital security assets, such as cryptographic keys, and other sensitive data from possible access by an attacker. In some implementations, the HSM may be a plug-in card or board that attaches directly to the computing system 700.

The I/O device(s) 725 may comprise one or more input/output devices that allow data to be received and/or transmitted by the computing system 700. For example, the I/O device 725 may include one or more input devices, such as a keyboard, touch screen, mouse, and the like, that enable data to be input from a user. Further, the I/O device 725 may include one or more output devices, such as a display screen, a CRT monitor, an LCD monitor, a plasma display, a printer, speaker devices, and the like, that enable data to be output or presented to a user. The I/O device(s) 725 may also include one or more digital and/or analog communication input/output devices that allow the computing system 700 to communicate, for example, digitally, with other machines and devices. Other configurations and/or numbers of input and/or output devices may be incorporated in the I/O device 725. The I/O device(s) 725 may form a portion or all of communications interface 160.

In the implementation shown, the computing system 700 is connected to a network 735, such as the Internet, a private network, controller area network (CAN) bus, a virtual private network, a cellular network, a GNSS network, an ecosystem network (e.g., a V2X network and/or members $EM_{1 \ldots n}$), and/or other network or combination of these, which may in turn be connected to various systems and computing machines, such as servers, personal computers, laptop computers, computerized devices 120, 130, 220, 230, etc. In general, the computing system 700 may input data from external machines and devices and output data to external machines and devices via the network 735.

In the exemplary implementation shown in FIG. 7, the data repository 716 is hosted by the computing system 700. In other implementations, the repository 716 may be a standalone data source external to system 700, such as a database (not shown) that is connected via the network 735. In various implementations, the repository 716 may manage and store data used to implement systems and methods consistent with the invention. For example, the repository 716 may be used to store messages received from ecosystem members, determined deviations, and confidence level determinations, among others. In some implementations, the repository 716 may manage and store data structures that contain the status and log information for each computerized device 120, 130.

In various implementations, the repository 716 may comprise one or more databases that store information and are accessed and/or managed through the computing system 700. By way of example, the repository 716 may be an Oracle™ database, a Sybase™ database, other relational databases, or non-relational databases. Systems and methods consistent with the invention, however, are not limited to separate data structures or databases, or even to the use of a database or data structure.

One of ordinary skill will recognize that the components and implementation details of the system in FIG. 7 are examples presented for conciseness and clarity of explanation. Other components and implementation details may be used.

Although the foregoing examples use specific examples of computerized devices, such a OBUs, ECUs, and RSUs, for clarity of explanation, the invention is not limited to those specific examples. In addition to the V2X devices used herein to illustrate these new capabilities, devices and methods, they may also be applied to any IoT devices, including those where time and/or geographic operating restrictions are desired. Thus, various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

The various operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example implementations, the processors or processor-implemented modules may be located in a single geographic location (e.g., within an office environment, a manufacturing environment, or a server farm). In other example implementations, the processors or processor-implemented modules may be distributed across a number of geographic locations.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for establishing a confidence level for local operational data of a device within an ecosystem, the system comprising:
   a local data source configured to maintain local operational data for the device;
   a communication interface; and
   a processor that is operably connected to the communication interface and the local data source;
   wherein the system is configured to perform operations comprising:
      obtaining, using the local data source, local operational data for the device;
      obtaining, using the communication interface, a plurality of messages from a plurality of external devices participating in the ecosystem, wherein each of the plurality of messages comprises external operational data corresponding to a respective external device;
      determining, using the processor and based on the local operational data and the external operational data from the plurality of messages, a confidence level for the local operational data; and
      executing a remedial action when the confidence level falls below a threshold for the confidence level; and
   wherein the local operational data comprises local time data, the external operational data comprises external time data, and the operations further comprise:
      generating an updated local time by updating the local time data to correspond to time information received from a publicly available service;
      comparing the external time data from each message of the plurality of messages to the updated local time data to determine a time deviation between the updated local time data and the external time data from each message; and
      in response to determining that the time deviation for a message exceeds a tolerance value, incrementing a deviation counter based on the time deviation.

2. The system of claim 1, wherein the operations further comprise updating the local operational data based on information received via the communication interface from the publicly available service.

3. The system of claim 2, wherein the updating is performed at a predetermined interval.

4. The system of claim 2, wherein the information is unencrypted and received from the publicly available service.

5. The system of claim 2, wherein the publicly available service is the global navigational satellite system (GNSS).

6. The system of claim 1, wherein each message of the plurality of messages is digitally signed.

7. The system of claim 1, wherein the operations further comprise:
   tracking the deviation counter over a specified time period to produce a tracked deviation; and
   using the tracked deviation for determination of the confidence level.

8. The system of claim 1, wherein at least one of the plurality of messages corresponds to at least one of: a basic safety message (BSM), a cooperative awareness message (CAM), or a decentralized environmental Notification Messages (DENM) in a V2X ecosystem.

9. The system of claim 1, wherein the device comprises one of an On Board Unit (OBU), an Electronic Control Unit (ECU), or a Road-Side Unit (RSU).

10. The system of claim 1, wherein:
    the device is configured for installation in one or more of a watercraft, an aircraft, a spacecraft, a medical device, a robot, a drone, a wireless communication module, a wired communication module, an electronic sign, a digital billboard, and an Internet of Things (IoT) device.

11. The system of claim 1, wherein the remedial action comprises one or more of: sending a warning message to a remote device, terminating communications from the device, executing a self-correction algorithm, and shutting down the device.

12. A non-transitory computer readable medium including instructions that, when executed by a processor of a device within an ecosystem, cause the processor to perform operations comprising:
    obtaining, using a local data source that maintains data for the device, local operational data for the device;
    obtaining a plurality of messages from a plurality of external devices participating in the ecosystem, wherein each of the plurality of messages comprises external operational data corresponding to a respective external device;
    determining, using the processor and based on the local operational data and the external operational data from the plurality of messages, a confidence level for the local operational data; and
    executing a remedial action when the confidence level falls below a threshold for the confidence level; and
    wherein the local operational data comprises local time data, the external operational data comprises external time data, and the operations further comprise:
       generating an updated local time by updating the local time data to correspond to time information received from a publicly available service;
       comparing the external time data from each message of the plurality of messages to the updated local time to determine a time deviation between the updated local time and the external time data from each message; and
       in response to determining that the time deviation for a message exceeds a tolerance value, incrementing a deviation counter based on the time deviation.

13. The non-transitory computer readable medium of claim 12, wherein the operations further comprise updating the local operational data based on information received from the publicly available service.

14. The non-transitory computer readable medium of claim 13, wherein the information is unencrypted.

15. The non-transitory computer readable medium of claim 13, wherein the publicly available service is the global navigational satellite system (GNSS).

16. The non-transitory computer readable medium of claim 12, wherein
each message of the plurality of messages is digitally signed.

17. The non-transitory computer readable medium of claim 12, wherein the operations further comprise:
tracking the deviation counter over a specified time period to produce a tracked deviation; and
using the tracked deviation for determination of the confidence level.

18. The non-transitory computer readable medium of claim 12, wherein at least one of the plurality of messages corresponds to at least one of: a basic safety message (BSM), a cooperative awareness message (CAM), or a decentralized environmental Notification Messages (DENM) in a V2X ecosystem.

19. The non-transitory computer readable medium of claim 12, wherein the device comprises one of an On Board Unit (OBU), an Electronic Control Unit (ECU), or a Road-Side Unit (RSU).

20. The non-transitory computer readable medium of claim 12, wherein the remedial action comprises one or more of: sending a warning message to a remote device, terminating communications from the device, executing a self-correction algorithm, and shutting down the device.

21. A computer-implemented method for establishing a confidence level for local operational data of a device within an ecosystem, the method comprising:
obtaining, using a local data source that maintains data for the device, local operational data for the device;
obtaining a plurality of messages from a plurality of external devices participating in the ecosystem, wherein each of the plurality of messages comprises external operational data corresponding to a respective external device;
determining, based on the local operational data and the external operational data from the plurality of messages, a confidence level for the local operational data; and
executing a remedial action when the confidence level falls below a threshold for the confidence level; and
wherein the local operational data comprises local time data, the external operational data comprises external time data, and the method further comprises:
generating an updated local time by updating the local time data to correspond to time information received from a publicly available service;
comparing the external time data from each message of the plurality of messages to the updated local time to determine a time deviation between the updated local time and the external time data from each message; and
in response to determining that the time deviation for a message exceeds a tolerance value, incrementing a deviation counter based on the time deviation.

22. The computer-implemented method of claim 21, wherein the method further comprises:
tracking the deviation counter over a specified time period to produce a tracked deviation; and
using the tracked deviation for determination of the confidence level.

23. A computer-implemented method for establishing a confidence level for local operational data of a device within an ecosystem, the method comprising:
obtaining, using a local data source that maintains data for the device, local operational data for the device;
obtaining a plurality of messages from a plurality of external devices participating in the ecosystem, wherein each of the plurality of messages comprises external operational data corresponding to a respective external device;
determining, based on the local operational data and the external operational data from the plurality of messages, a confidence level for the local operational data; and
executing a remedial action when the confidence level falls below a threshold for the confidence level; and
wherein the local operational data comprises local position data, the external operational data comprises external position data, and the method further comprises:
generating an updated local position by updating the local position data in the local operational data based on position information received from a publicly available service;
comparing the external position data from each message of the plurality of messages to the updated local position to determine a position deviation between the updated local position and the external position data from each message; and
in response to determining that the position deviation for a message exceeds a tolerance value, incrementing a deviation counter based on the position deviation.

24. The computer-implemented method of claim 23, wherein the method further comprises:
tracking the deviation counter over a specified time period to produce a tracked deviation; and
using the tracked deviation for determination of the confidence level.

25. The computer-implemented method of claim 23, wherein at least one of the plurality of messages corresponds to at least one of: a basic safety message (BSM), a cooperative awareness message (CAM), or a decentralized environmental Notification Messages (DENM) in a V2X ecosystem.

26. The computer-implemented method of claim 21, wherein at least one of the plurality of messages corresponds to at least one of: a basic safety message (BSM), a cooperative awareness message (CAM), or a decentralized environmental Notification Messages (DENM) in a V2X ecosystem.

27. A system for establishing a confidence level for local operational data of a device within an ecosystem, the system comprising:
a local data source configured to maintain local operational data for the device;
a communication interface; and
a processor that is operably connected to the communication interface and the local data source;
wherein the system is configured to perform operations comprising:
obtaining, using the local data source, local operational data for the device;
obtaining, using the communication interface, a plurality of messages from a plurality of external devices participating in the ecosystem, wherein each of the plurality of messages comprises external operational data corresponding to a respective external device;
determining, using the processor and based on the local operational data and the external operational data from the plurality of messages, a confidence level for the local operational data; and executing a remedial action when the confidence level falls below a threshold for the confidence level; and wherein the local operational data comprises local position data, the external operational data comprises external position data, and the operations further comprise:

generating an updated local position by updating the local position data in the local operational data based on position information received from a publicly available service;

comparing the external position data from each message of the plurality of messages to the updated local position data to determine a position deviation between the updated local position data and the external position data from each message; and in response to determining that the position deviation for a message exceeds a tolerance value, incrementing a deviation counter based on the position deviation.

28. The system of claim 27, wherein the operations further comprise:

tracking the deviation counter over a specified time period to produce a tracked deviation; and using the tracked deviation for determination of the confidence level.

29. A non-transitory computer readable medium including instructions that, when executed by a processor of a device within an ecosystem, cause the processor to perform operations comprising:

obtaining, using a local data source that maintains data for the device, local operational data for the device;

obtaining a plurality of messages from a plurality of external devices participating in the ecosystem, wherein each of the plurality of messages comprises external operational data corresponding to a respective external device;

determining, using the processor and based on the local operational data and the external operational data from the plurality of messages, a confidence level for the local operational data; and executing a remedial action when the confidence level falls below a threshold for the confidence level; and wherein the local operational data comprises local position data, the external operational data comprises external position data, and the operations further comprise:

generating an updated local position by updating the local position data in the local operational data based on position information received from a publicly available service;

comparing the external position data from each message of the plurality of messages to the updated local position data to determine a position deviation between the updated local position data and the external position data from each message; and in response to determining that the position deviation for a message exceeds a tolerance value, incrementing a deviation counter based on the position deviation.

30. The non-transitory computer readable medium of claim 29, wherein the operations further comprise:

tracking the deviation counter over a specified time period to produce a tracked deviation; and using the tracked deviation for determination of the confidence level.

* * * * *